United States Patent

Call

[11] 4,360,072
[45] Nov. 23, 1982

[54] ATTACHMENT FOR ADDING WEIGHTS TO SCALE BEAM

[76] Inventor: Lloyd S. Call, 1352 E. Center, P.O. Box 4516, Pocatello, Id. 83201

[21] Appl. No.: 256,546

[22] Filed: Apr. 22, 1981

[51] Int. Cl.³ .................................... G01G 21/26
[52] U.S. Cl. .......................... 177/247; 177/250
[58] Field of Search ................. 177/246–252, 177/264, 171, 172, 190, 197

[56] References Cited

U.S. PATENT DOCUMENTS

| 609,880 | 8/1898 | Fleming | 177/247 X |
| 620,606 | 3/1899 | MacCauley | 177/252 |
| 2,931,637 | 4/1960 | Johnson | 177/252 X |
| 3,021,911 | 2/1962 | Pecker | 177/251 |

*Primary Examiner*—Joseph W. Hartary
*Attorney, Agent, or Firm*—Littlepage & Webner

[57] ABSTRACT

An attachment to the beam of a weight scale has a vertical post to retain weight unit discs, each with a hole in the center, and clamping means in combination with a counterweight clamped to the second beam of the scale at the opposite end.

1 Claim, 1 Drawing Figure

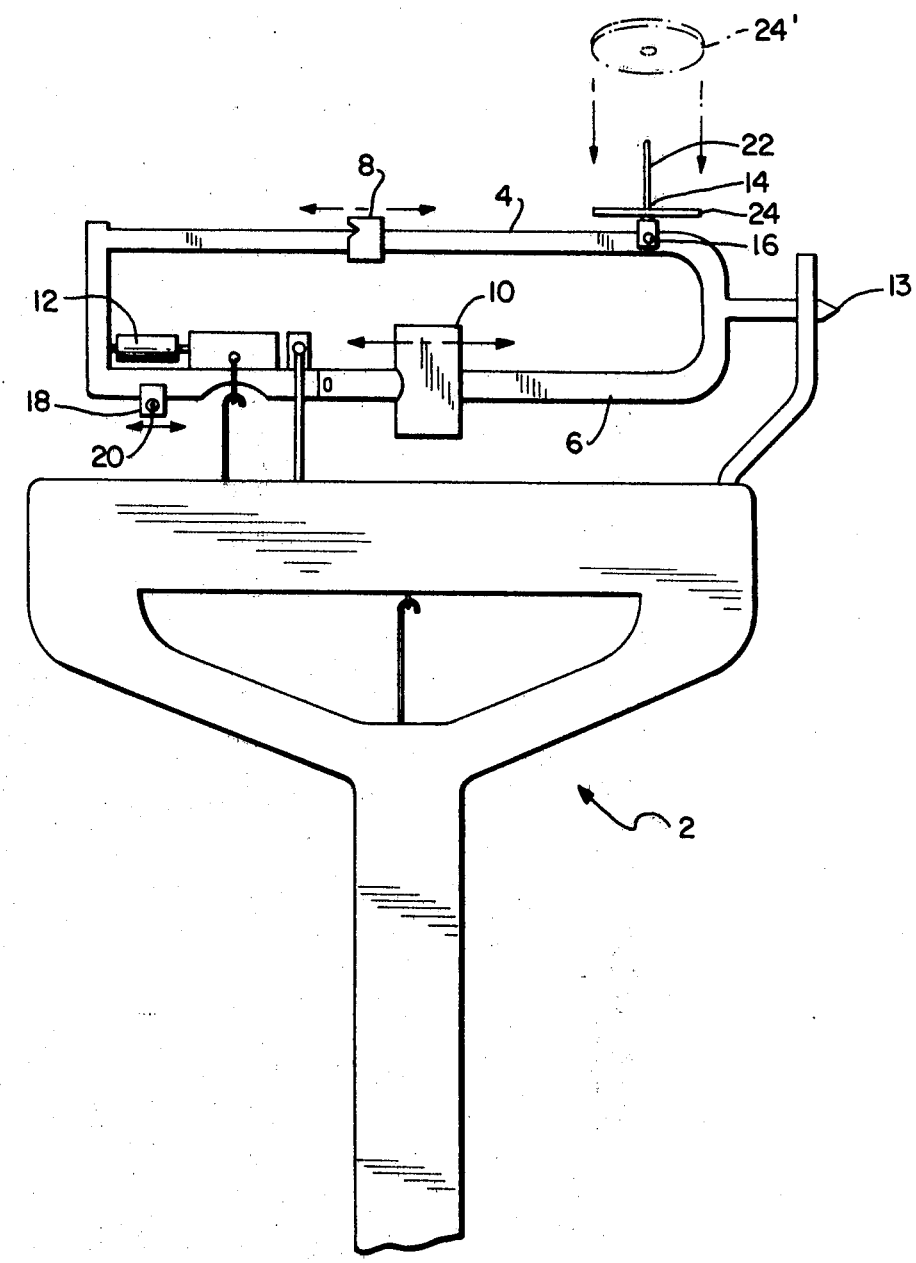

ATTACHMENT FOR ADDING WEIGHTS TO SCALE BEAM

FIELD OF INVENTION

Weighing Scales—Beam

PRIOR ART

Johnson U.S. Pat. No. 2,931,637

OBJECTS

The object of this invention is to provide attachments to standard weight scales frequently used in hospitals and doctors' offices such that the capacity of the scales for weighing patients can be increased from the usual 250 to 300 pounds. While this weight capacity is usually sufficient, there are occasions when heavier patients cannot be weighed on a standard scale. Since this is not frequently the case, an inexpensive, easy way of modifying the scale is needed. The scale attachments of the invention can be easily clamped to the scale beam be set screws and are inexpensive means to modify the capacity of weight scales.

These and other objects will be apparent from the following specification and drawing, in which the sole FIGURE is a front elevational view of the upper portion of a weight scale with the attachments in place on the scale beams.

Referring now to the drawing, a double-beam weight scale 2 is shown with upper beam 4 and lower beam 6, each with a counterpoise 8, 10, slidable along each beam. The scale has a means 12 for adjusting the scale to a "zero" setting and a pointer 13 to indicate when the scale is in balance.

The attachments of the invention are shown clamped in place, consisting of a weight holder 14 clamped to the upper beam 4 by a set screw 16 in combination with an adjustable counterweight 18 clamped to the lower beam 6 by a set screw 20, on the opposite end of the lower beam in relation to the weight holder 14.

The counterweight 18 is slidably adjustable on the lower beam 6 to allow the scale 2 to adjust to "zero" when the weight holder 14 is clamped in place on the opposite end of the upper beam 4.

The weight holder 14 has a vertical post 22 which retains in place units of weight 24, each unit of weight being in the form of a disc with a hole in the center. Each disc, for example, could be of sufficient weight to balance 50 pounds on the scale. One weight unit is shown in place on the weight holder 14 in FIG. 1 and a second weight unit 24', shown in broken lines, is shown prior to being placed on the weight holder.

In operation, the weight holder 14 is clamped in place on one end of the upper beam 4, closest to the pointer 13 by set screw 16. The counterweight 18 is clamped to the lower beam 6 in opposite relation to the weight holder 14 and slidably adjusted until the scale pointer 13 indicates a "zero" setting.

Weight unit discs 24 are added to the weight holder to increase the capacity of the scale until the counterpoises 8, 10 of the scale can be used to balance the scale. The sum of the weight unit discs added to the readings on the upper and lower beams will indicate the weight of the object being weighed.

I claim:

1. A weight scale with a balancing beam, pivot means intermediate of the ends of the beam, a slidable counterpoise on the beam on one side of the pivot means, adjustable counterweight zero-balancing means for the counterpoise on the other side of the pivot means, the improvement which comprises:

a weight holder comprising a vertical post for retaining weight units, and clamp means on said post for removably and adjustably attaching the same to the beam at a selected position along the length thereof on said one side of the pivot means, said weight units each comprising a disc with a hole through the center thereof for engaging over the vertical post of the weight holder, a second counterweight, and clamp means for removably and adjustably mounting the second counterweight at a selected position along the length of the beam on said other side of the pivot means, whereby to counter balance the weight of the weight holder and the first-mentioned clamp means.

* * * * *